(12) United States Patent
Aizawa et al.

(10) Patent No.: US 6,696,097 B2
(45) Date of Patent: Feb. 24, 2004

(54) METHOD OF MAKING A SHAPED PLASTIC MAGNET

(75) Inventors: Masami Aizawa, Matsudo (JP); Akihiro Ito, Chiba (JP); Yasufumi Naoi, Chiba (JP)

(73) Assignee: Seiko Precision Inc., Tokyo (JP)

( * ) Notice: Subject to any disclaimer, the term of this patent is extended or adjusted under 35 U.S.C. 154(b) by 0 days.

(21) Appl. No.: 10/153,985

(22) Filed: May 23, 2002

(65) Prior Publication Data
US 2002/0197512 A1 Dec. 26, 2002

Related U.S. Application Data

(63) Continuation of application No. 09/483,886, filed on Jan. 18, 2000, now abandoned.

(30) Foreign Application Priority Data

Jan. 19, 1999 (JP) .............................................. 11-10557

(51) Int. Cl.[7] ................................................... B05D 5/12
(52) U.S. Cl. ........................ 427/123; 264/129; 427/58; 427/126.1; 427/127; 427/383.1; 427/386
(58) Field of Search ....................... 427/123, 58, 126.1, 427/127, 383.1, 386; 264/129

Primary Examiner—Bernard Pianalto
(74) Attorney, Agent, or Firm—Schulte Roth & Zabel LLP

(57) ABSTRACT

A shaped plastic magnet comprising a shaped body obtained by molding a mixture of an SmFeN magnetic powder with a resin binder into a desired shape, where the surface of the shaped body is subjected to a coating treatment using a phosphate. Preferably, the coating treatment is performed by using a paint containing a phosphate. The shaped plastic magnet may be used as a rotor to be incorporated in motors. The product is highly resistant against corrosion, and provides extended life to motor rotors and the like.

13 Claims, 2 Drawing Sheets

METHOD OF MAKING A SHAPED PLASTIC MAGNET

RELATED APPLICATIONS

This application is a continuation of the U.S. patent application Ser. No. 09/483,886 abandoned filed on Jan. 18, 2000 and claims all rights of priority thereto.

TECHNICAL FIELD OF THE INVENTION

The present invention relates to a shaped plastic magnet for use in rotors of compact motors, as well as other applications and a method of making the same.

BACKGROUND OF THE INVENTION

It is well known that permanent magnets are used in a vast field of applications. They play an especially important role in electronic appliances as a component in compact motors. The performance of permanent magnets has improved year after year. With regard to the magnetic material, there has been a shift from Alnico to ferrite magnets, and further to samarium-cobalt (Sm—Co) or neodymium-iron-boron (Nd—Fe—B) type magnets, i.e., to those having higher magnetic flux densities.

Formerly, the permanent magnets were used in the form of metallic elements, but it is also well known that they are now used in the form of shaped bodies prepared by sintering compounds, or in the form of resin bonded magnets obtained by molding a kneaded product of magnetic powders with resin powder binders (see, for instance, JP-B-Hei6-87634, wherein the term "JP-B-" signifies "an examined published Japanese patent application").

More recently, SmFeN magnets are being employed as a magnet having a high maximum energy product. These types of magnets are expected to be most suitable for use in the rotors of compact motors embedded in compact instruments such as cameras and watches because, due to their high maximum energy product, they can maintain high flux densities even if they are minimized in size.

However, as is described in detail hereinafter, SmFeN magnets suffer from the presence of unstable Fe (iron) that is incorporated in the bonded magnet because the Fe component accounts for about 67% of the entire material. The iron that is present in an unstable state undergoes corrosion and generates rust which shortens the life of the magnet, and, moreover, the rust deposits as a fine powder on the surface of the magnet during the use of the magnet, thereby impairing the performance of the motor, etc., in which the magnet is incorporated. To cope with the problem of corrosion, it is known to bake coat the magnet with a thermosetting resin such as a fluroresin, a phenolic resin, an epoxy resin, or a modified product thereof. However, there is still a problem that a sufficiently high corrosion resistance is not realized.

SUMMARY OF THE INVENTION

As a means to overcome the problems above, the shaped plastic magnet according to the present invention provides a shaped plastic magnet comprising a shaped body obtained by molding a mixture of an SmFeN magnetic powder with a resin binder into a desired shape, where the surface of the molded shaped body is subjected to a coating treatment using a phosphate. In this manner, the Fe component that is present in the surface of the bonded magnet provides a phosphate compound having excellent corrosion resistance and high adhesiveness.

DESCRIPTION OF THE PREFERRED EMBODIMENTS

Figure 1:
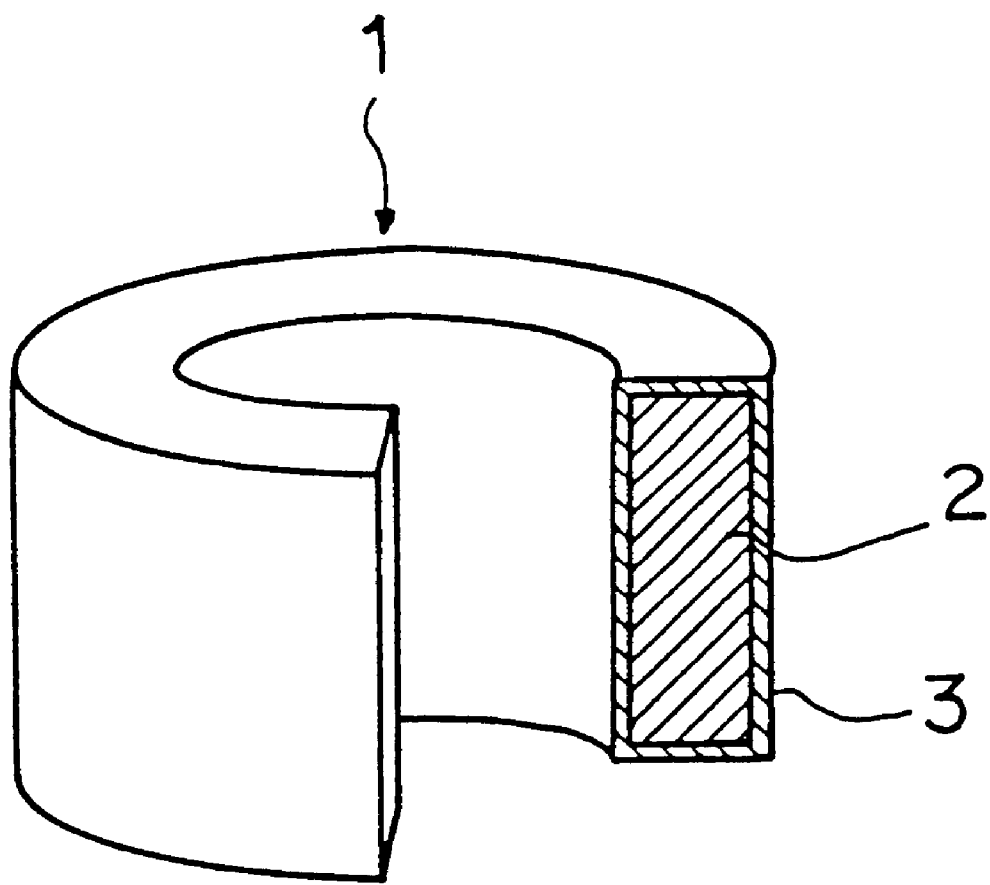
FIG. 1 is a partially broken perspective view of the magnet according to an embodiment of the present invention.

The present invention is described in further detail below by making reference to an embodiment according to the present invention. FIG. 1 provides, as an example, a mode of using the shaped plastic magnet according to the present invention as a cylindrical rotor magnet for use in compact motors. As the material for the shaped plastic magnet according to the present invention, there is used a powder of SmFeN (in general, it is denoted as iron samarium nitride, samarium iron nitrogen, or samarium iron nitride, etc.), which is kneaded together with an epoxy resin or a polyamide resin (Nylon) employed as the binder. A low melting point metal (e.g., Zn, which has a melting point of 419.58° C., Pb, which has a melting point of 327.5° C., solders, which have various melting points dependent upon their composition, etc.) with a melting point less than or equal to 419.58° C. may also be used as the binder.

In the present example, there is employed a plastic magnet obtained by kneading 91% by weight (denoted hereinafter as "wt. %") of SmFeN magnetic powder with 9 wt. % of polyamide (Nylon) as the binder, and then injection molding the kneaded product. The SmFeN magnetic powder accounting for 91 wt. % consists of about 22 wt. % of Sm (samarium), 67 wt. % of Fe (iron), and 2 wt. % of N (nitrogen). The magnet contains about 56.9% by volume of the magnetic powder, and yields a maximum energy product (BHmax) of 12.6 MGOe (Mega Gauss Oersted). A bonded magnet obtained therefrom enables a surface magnetic flux density up to ca. 2,800 G (Gauss). For reference, the maximum energy product (BHmax) of a resin bonded magnet comprising 93 wt. % of a SmCo (samarium cobalt) magnetic powder is about 10 MGOe.

Referring to FIG. 1, a shaped magnet 1 consists of the molded product 2 above subjected to a rust preventive treatment with its surface entirely covered with a coating 3. The coating 3 formed on the surface is provided by using a paint containing a phosphate selected from epoxy resin based baking type paints used as primer anticorrosion paints for metals. More specifically, a paint containing aluminum phosphate as the rust preventive pigment (which is simply referred to hereinafter as "an aluminum phosphate type paint") was used as the paint containing a phosphate, and after forming a coating which covers the entire surface of the magnet 2, the resulting product was baked at 125° C. for a duration of 1 to 2 hours to form a coating tightly adhered to the surface of the magnet. In this manner, the shaped plastic magnet 1 having a bright anticorrosive coating 3 on the surface thereof was obtained as a result.

On close investigation of the magnified cross section of the shaped magnet 1, it was found that, although differing depending on the position of the surface, there was formed a coating 3 ranging in thickness of from 20 to 40 μm by coating once, and a coating 3 ranging in thickness of from 40 to 80 μm by applying the coating twice. Furthermore, no peeling off nor cracks were found in the coating.

Then, the thus obtained shaped plastic magnet was immersed into a physiological saline solution at ordinary temperature, and examinations were made thereon for the formation of rust. No formation of rust was observed even after 120 days. For reference, a similar experiment was performed on a same type of a magnet whose surface was coated with a commonly used epoxy based resin paint, but rust was found to form after three days. Furthermore, the shaped plastic magnet 1 was found to remain unchanged for 20 days on subjecting it to a more severe environment by immersing it into a 10% hydrochloric acid solution.

Such a high effect concerning corrosion resistance is believed to be attributed to the excellent bonding that is formed between the SmFeN magnet and the aluminum phosphate type paint. More specifically, it is assumed that, among the Fe components included in the SmFeN magnet, Fe that is present in an unstable state accounts for the formation of the rust. However, by performing the coating treatment using the paint containing the anticorrosive phosphate, the unstable Fe undergoes a chemical reaction to form a dense phosphate coating having excellent corrosion resistance and high adhesiveness.

The aforementioned chemical reaction which occurs during the phosphate coating treatment is expressed by the following chemical formulae:

$$3Al(H_2PO_4)_2 \Leftrightarrow 3AlHPO_4 + 3H_3PO_4 \quad (1)$$

$$3AlHPO_4 \Leftrightarrow Al_3(PO_4)_2 + H_3PO_4 \quad (2)$$

$$Fe + H_3PO_4 \Leftrightarrow Fe(H_2PO_4)_2 + H_2\uparrow \quad (3)$$

The iron hydrogen phosphate $Fe(H_2PO_4)_2$ expressed by the chemical formula (3) above forms a coating having high adhesiveness and excellent corrosion resistance.

Figure 2:
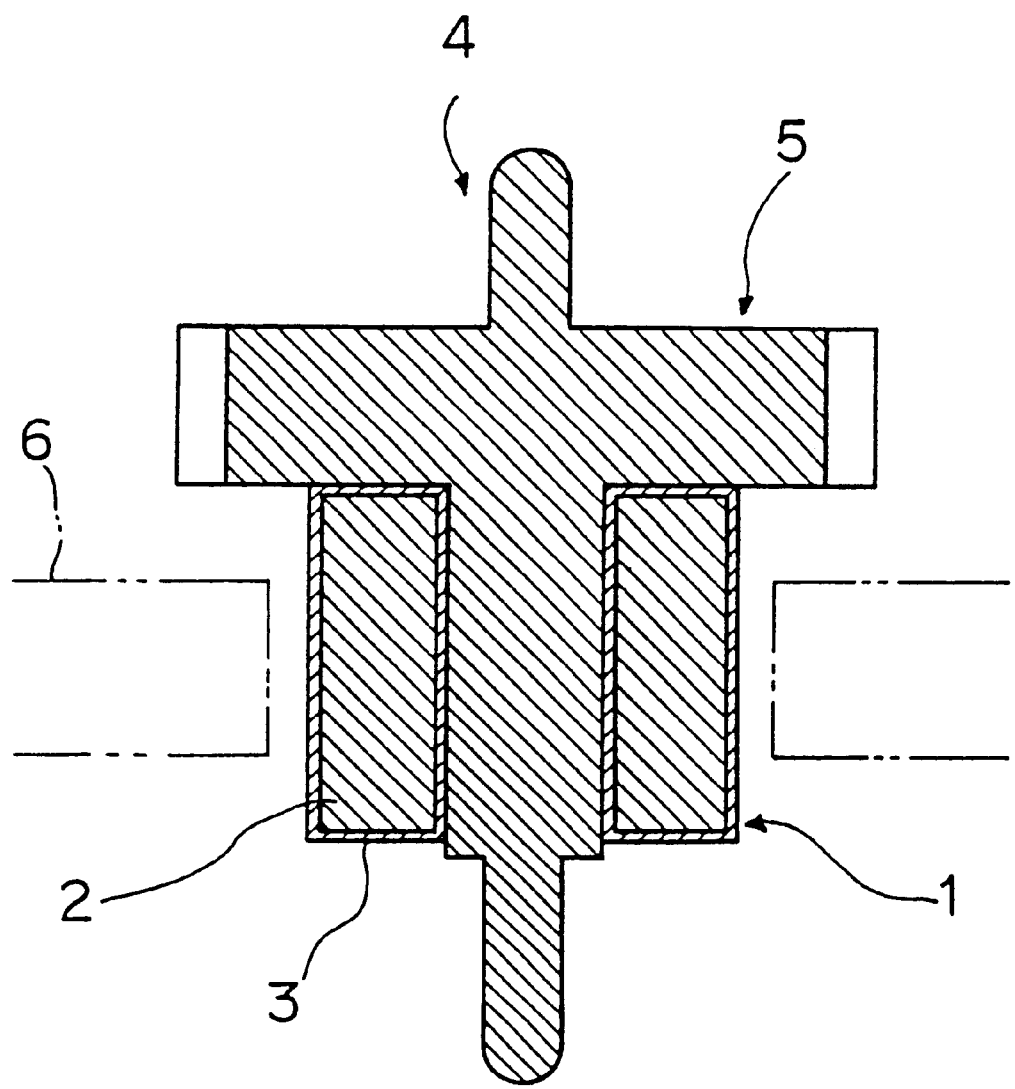
FIG. 2 is a cross section view of a motor rotor which comprises embedded therein a shaped plastic magnet according to an embodiment of the present invention.

In FIG. 2 is shown an example of a rotor 4 for a compact motor having incorporated therein the aforementioned shaped plastic magnet 1 as the rotor magnet. The rotor 4 comprises a hard plastic rotor die 5 whose shaft portion is press fitted into the rotor magnet made from the shaped plastic magnet 1 according to the present invention.

As described above, the shaped plastic magnet 1 yields an extremely high magnetic flux density. Thus, if the shaped plastic magnet 1 alone is magnetized, two such magnets will absorb each other and it become very difficult to pull them apart. Accordingly, in general, both magnets are first bonded monolithically and then magnetized. The polarity of the magnet formed into a ring-like shape is set as such that the periphery consists of alternatively arranged N- and S-poles.

The rotor 4 is rotated by alternatively changing the magnetized polarity of a stator 6 provided in such a manner that it may surround the periphery of the rotor magnet.

It should be noted that the compositional ratio of the SmFeN magnet used in the embodiment above is only an example, and it is possible to use other SmFeN magnets which differ in compositional ratio. Furthermore, concerning the paint containing a rust preventive phosphate, it is also acceptable to use, for instance, a paint containing zinc phosphate and other phosphate containing paints in the place of the paint exemplified above. In case of using a paint containing zinc phosphate or other phosphate containing paints, the chemical formulae above are still applicable by simply changing the aluminum component to zinc and the like. Needless to say, in this case again, the same $Fe(H_2PO_4)_2$ (iron hydrogenphosphate) having high adhesiveness and excellent corrosion resistance is formed.

The shaped plastic magnet according to the present invention yields a high magnetic flux density. Thus, by constituting a motor and the like by using the shaped plastic magnet, there can be realized a motor and the like not only minimized in size, but also imparted with excellent corrosion resistance because the surface of the molding is subjected to a phosphate coating treatment. Accordingly, the life of an instrument equipped with the motor and the like can be extended. Furthermore, because the coating of the Fe compound formed by the phosphate coating treatment is tightly adhered to the surface of the molding, the use of such molding in motor rotors and the like improves the performance of the motors.

While the invention has been described in detail by making reference to specific examples, it should be understood that various changes and modifications can be made without departing from the scope and the spirit of the present invention.

What is claimed is:

1. A method of making a magnet comprising molding a mixture of an SmFeN magnetic powder with a binder into a desired shape and coating the surface of the shaped body in one step with a paint containing a phosphate.

2. The method as claimed in claim 1, further comprising baking the coated shaped body to adhere the coating to the surface.

3. The method as claimed in claim 1, wherein said binder is a resin.

4. The method according to claim further comprising baking the coated shaped body to adhere the coating to the surface.

5. The method as claimed in claim 3, wherein said phosphate is one of aluminum phosphate and zinc phosphate.

6. The method as claimed in claim 3, wherein said mixture is comprised of 91 wt. % SmFeN magnetic powder and 9 wt. % binder.

7. The method as claimed in claim 1, wherein said phosphate is one of aluminum phosphate and zinc phosphate.

8. The method according to claim 1, wherein said binder is one of an epoxy resin and a polyamide resin.

9. The method as claimed in claim 1, wherein said binder is a low melting point metal.

10. The method according to claim 1, wherein said binder is a material selected from the group consisting of zinc, lead and solder.

11. The method as claimed in claim 1, wherein said mixture is comprised of 91 wt. % SmFeN magnetic powder and 9 wt. % binder.

12. The method according to claim 1, wherein the mixture of an SmFeN magnetic powder with a resin binder comprises 22 wt. % Sm, 67 wt. % Fe and 2 wt. % N.

13. The method as claimed in claim 1, wherein the shaped body is a rotor for motors.

* * * * *